United States Patent [19]

Gibbs

[11] Patent Number: 5,272,585
[45] Date of Patent: Dec. 21, 1993

[54] SYSTEM TO PREVENT ELECTRICAL SHORTS BY A MICROPROCESSOR BREAKER BOX

[76] Inventor: John H. Gibbs, 333 S. Clay St., Mooresville, Ind. 46158

[21] Appl. No.: 722,306

[22] Filed: Jun. 27, 1991

[51] Int. Cl.⁵ .............................................. H02H 3/00
[52] U.S. Cl. .......................................... 361/64; 361/66
[58] Field of Search .............. 361/66, 87, 64, 65; 340/310

[56] References Cited

U.S. PATENT DOCUMENTS

| | | | |
|---|---|---|---|
| 3,873,887 | 3/1975 | Barkan et al. | |
| 4,321,644 | 3/1982 | Brasfield | 361/56 |
| 4,331,999 | 5/1982 | Engel et al. | 361/94 |
| 4,346,422 | 8/1982 | Inzoli | 361/62 |
| 4,375,072 | 2/1983 | Rice | 361/87 |
| 4,530,024 | 7/1985 | Brady, Jr. | 361/63 |
| 4,814,932 | 3/1989 | Morelli | 361/63 |
| 4,858,054 | 8/1989 | Franklin | 361/57 |
| 4,889,999 | 12/1989 | Rowen | 307/31 |
| 4,903,162 | 2/1990 | Kopelman | 361/103 |

*Primary Examiner*—Todd E. DeBoer
*Attorney, Agent, or Firm*—Woodard, Emhardt, Naughton, Moriarty & McNett

[57] ABSTRACT

A system to stop or reduce electrical short circuits in homes. This invention is a refinement of the breaker box function. A computer controls breaker switching in the breaker box. A sum of the theoretical power consumption in a given breaker helps the computer determine if an electrical short is present. Outlet modules attach themselves to the home's standard electrical outlet (socket). They tell the computer when a new load (finite resistance) is to change the old theoretical breaker limit. The computer adjusts the theoretical limit to a new limit (never above maximum permitted) and allows the power drain on the breaker.

4 Claims, 6 Drawing Sheets

SYSTEM TO PREVENT ELECTRICAL SHORTS BY A MICROPROCESSOR BREAKER BOX

BACKGROUND OF THE INVENTION

1. Field of the Invention

The scope of this invention includes residential breaker boxes that deactivate electrical power (distributed thoughout the house) when power exceeds individual breaker limits. In the traditional breaker, the power limit is set by the breaker's intrinsic physical properties. In this invention, breakers are electrically controlled by a computer. A check sum of the power consumption determines how to set individual breaker limits.

2. Description of the Prior Art

Franklin (U.S. Pat. No. 4,858,054) teaches of a fire prevention system that has a circuit to limit the rate of power consumption over time. This is designed to prevent electrical arcs in the wiring. Kopelman (U.S. Pat. No. 4,903,162) has a new plug for appliance that has a built in fuse.

The closest similar patent (U.S. Pat. No. 4,814,932) is A. Morelli. His design is to put circuit breakers at each node in the electrical network.

The X-10 transmission theory (metioned in this document) of communication thoughout the electrical network is U.S. Pat. No. 4,889,999.

SUMMARY OF INVENTION

This invention relates to residential breaker boxes that distribute and control electric power throughout the house. The breaker box has a safety feature that stops a short circuit from starting a fire. This invention is for better control of this safety measure. A toaster that uses 5 amps of power can cause a fire without causing a 20 amp circuit breaker to trip. This invention is a microcomputer as a part of the breaker box that keeps track of power usage and can electrically control power in house's circuits to minimize electrical shorts. The computer adds up the individual electrical outlet's power history to determine how to control the breakers inside the breaker box.

Figure 1:
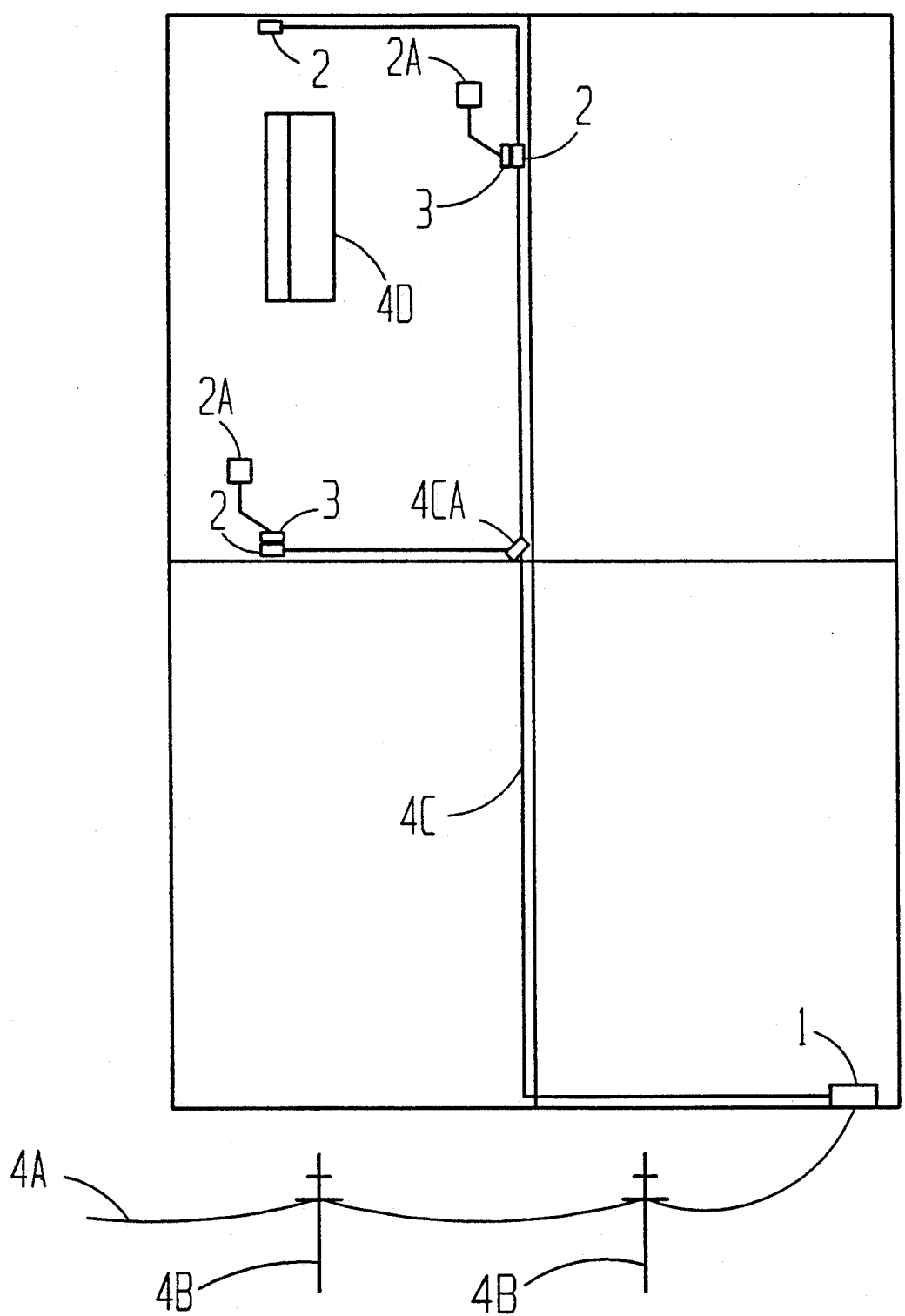
FIG. 1 shows an electrical view of a typical residential house that has the microprocessor breaker box & outlet modules installed.

DESCRIPTION OF THE PREFERRED EMBODIMENTS:

FIG. 1 shows the house's electric wiring. The main component is the circuit breaker box 1 which supplies electric power by the electric company's service (4A & 4B). Inside the house, the electric wires 4C come from the breaker box 1 and distribute throughout the house. Outlets 2 connect the electric power to the appliances 2A. The outlet module box 3 is used in houses inplace of built in devices (appliances or outlets). The module 3 plugs into the outlet 2 and the appliance 2A plugs into the module 3.

Figure 2:
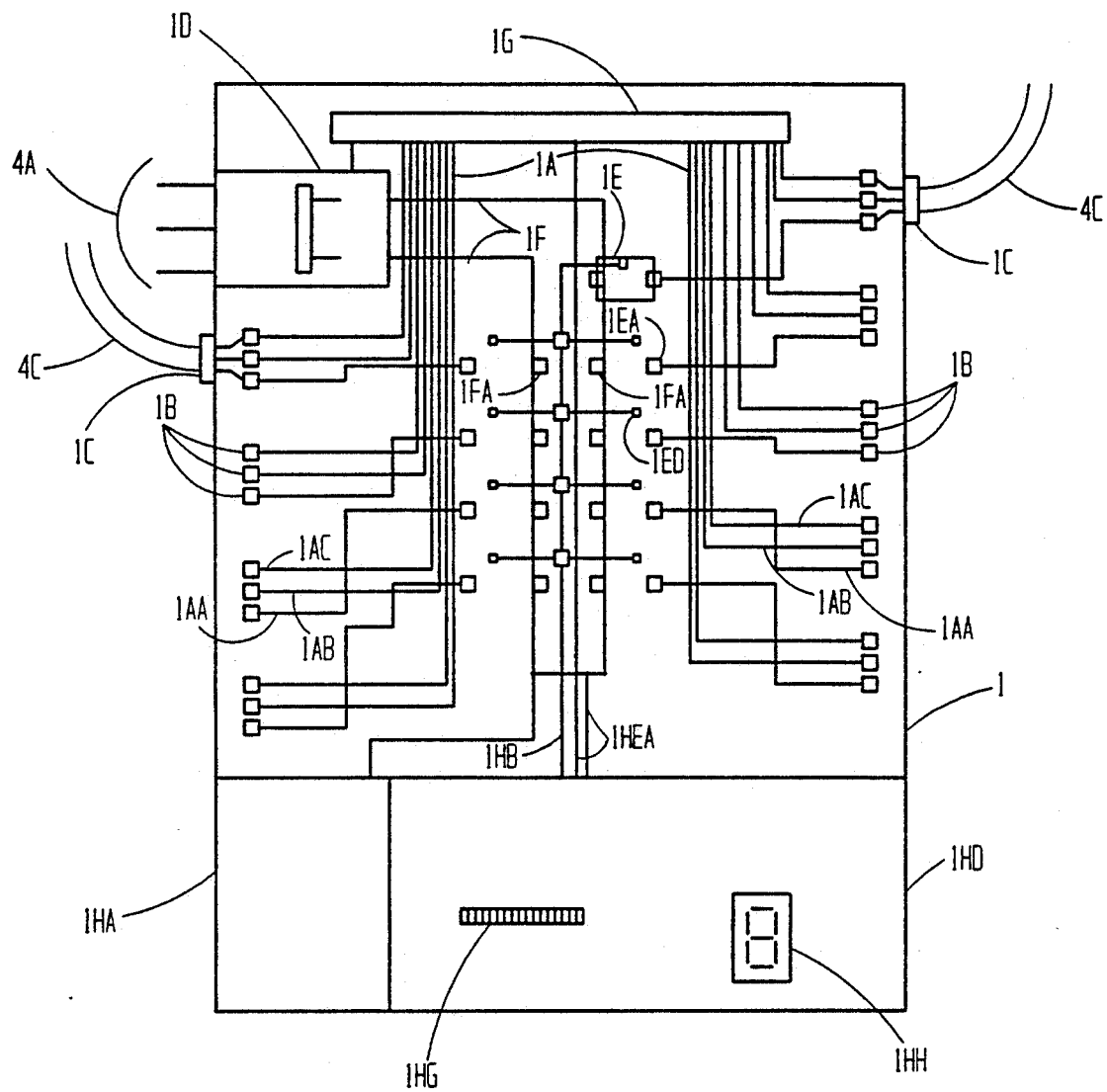
FIG. 2 illustrates the electrical view of the microprocessor breaker box.

FIG. 2 shows the microprocessor circuit breaker box 1 with electric input 4A and output 4C. The input 4A is connected to a large standard safty breaker 1D. The circuit breaker box 1 has the standard power grid 1F and ground bar 1G. In the power grid 1F, there are prongs 1FA for breaker modules 1E to plug into so the power can be connected to the house' electric wiring 4C. The house's electric circuit wires 4C are secured to the breaker box by fasteners 1C. The wires 4C are separated to screw connectors 1B. Each of these screw connectors 1B is hardwired on a pre-arranged circuit to power 1AA (to breaker 1E) and ground bar (one negative ground 1AB and one safty ground 1AC). Each breaker module 1E is addressed by the Triac-Ampere bus 1HB at a connecting prong 1ED. This Triac-Ampere bus 1HB can address each of the breaker modules 1E in the power grid 1F and exchange data between that module 1E and the computer unit 1HD. The signal lines 1HEA carry communication data from electrical outlets 3 around the house. It is important to note that communication thru the house's electric wiring is not essential to this system. Small radio transmitters/receiver can also carry the information. The control unit 1HD is supported by a rechargable battery 1HA for emergency conditions (to keep the system operating at all times). The control unit 1HD has an error display 1HH for signaling the owner of the type of error involved. The dip switches 1HG contain information on the maximium allowed ampere usage to a specific breaker.

Figure 3:
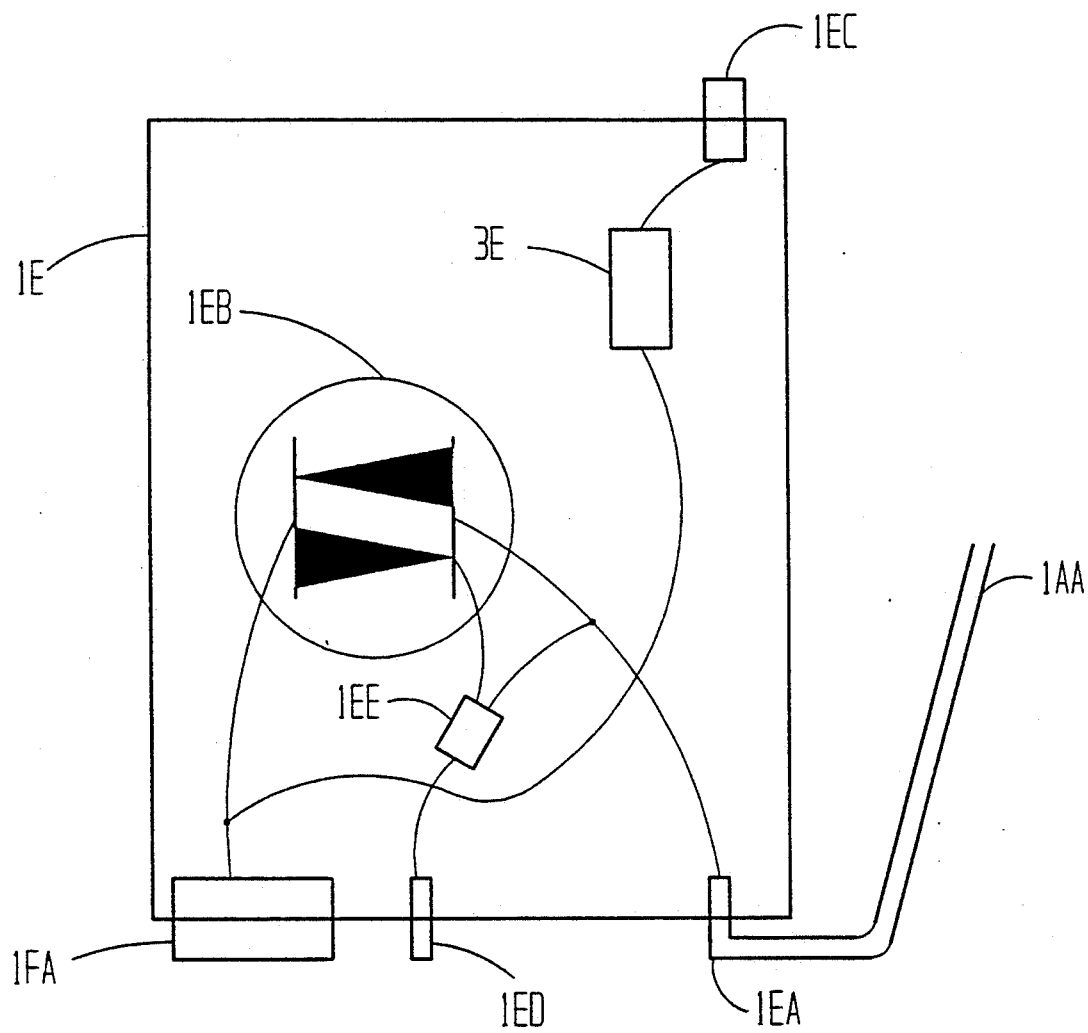
FIG. 3 shows the electrical diagram for a breaker module that is used in the microprocessor breaker box.

FIG. 3 illustrates the breaker module 1E that locks into the microprocessor circuit breaker box 1. The locking action is possible by the hooks 1EA and power prong 1FA. The triac switch 1EB allows the power from grid 1FA to be controlled electrically by the computer control's triac-ampere bus 1ED. The bus line 1ED can send a high voltage signal that toggles the switch 1EE. After the signal, the bus line 1ED is connected to either the triac switch 1EB (for control) or to the output power 1AA (for ampereage sensing). The reset buttom 1EC activates the signal transmitter 3E that tells the control unit 1HD to open the triac switch 1EB for power.

Figure 4:
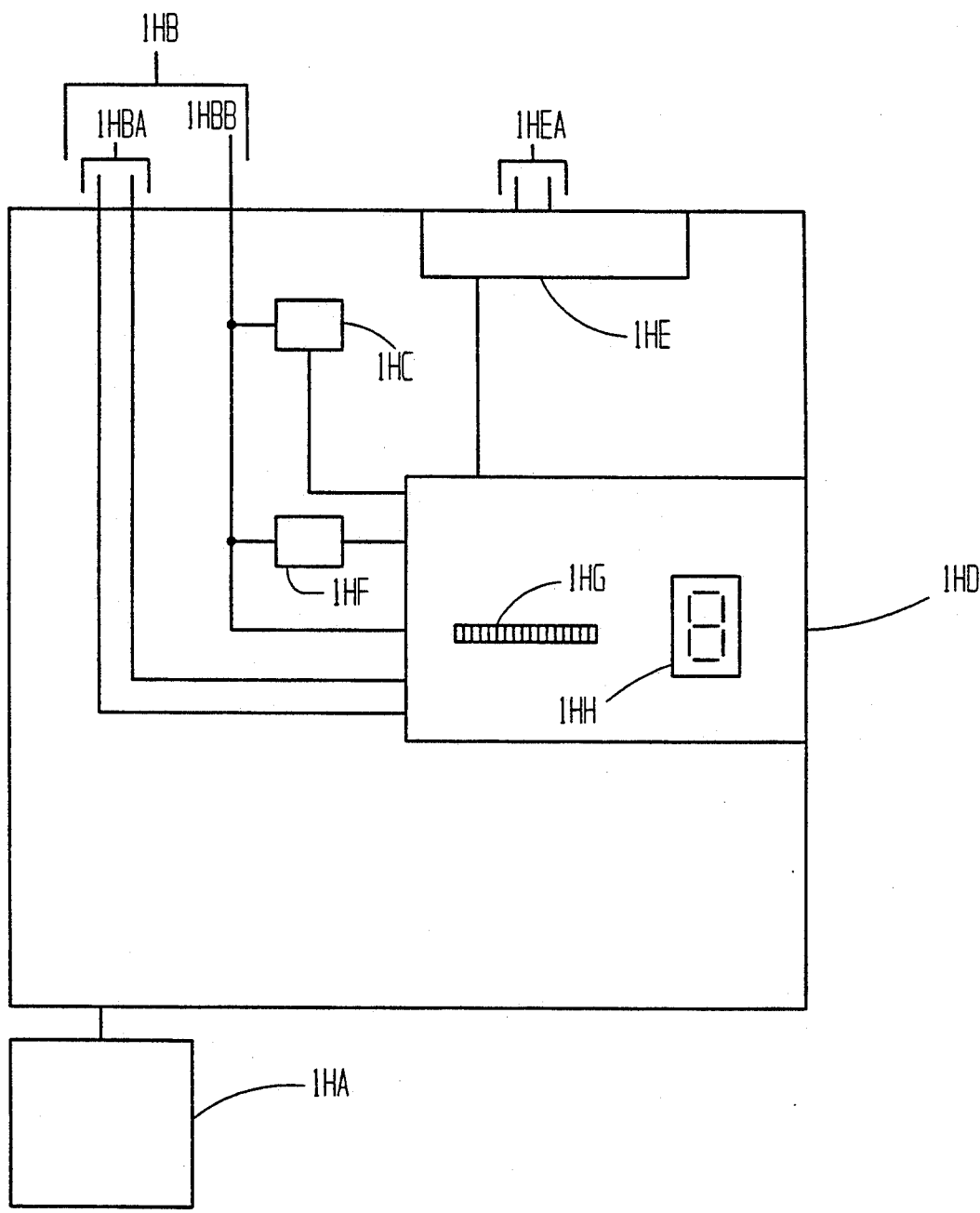
FIG. 4 shows the electronic layout of the computer control unit.

FIG. 4 illustrates the computer control unit. The RAM-ROM processor 1HD is the digital control. This unit 1HD inputs amp usage in each breaker module 1E and signal codes from the signal decoder & converter to digital unit 1HE (from each outlet module 3). The RAM-ROM processor 1HD is a small computer that stores signal codes and amps used by the individual outlets. When a shutdown of a breaker occurs or any other error happens, the computer 1HD issues an error code on the display 1HH. The dip switches 1HG tell the computer 1HD the maximium amperes allowed for an individual breaker 1E. The bus 1HB has two parts. The selection part 1HBA directs the data part 1HBB to a specific breaker 1E in the box 1. The voltage toggle 1HC sends a short pulse of high voltage to the breaker module 1E to redirect the data part (amp sensoring or triac control). The amp sensor 1HF indicates the current amperage of a given breaker 1E. The control unit 1HD can send a signal to the triac switch 1EB for shutdown procedure. The signal decoder 1HE converts outlet modules' 3 signals to digital input for the computer 1HD.

The signal communication between the breaker box 1 and the outlet modules 1E can be done in three possible ways. One way is radio waves (with small power). Another way is to run a hardwire between the outlet 3 and the breaker box 1. The last way is to use the existing electric lines and transmit a frequency other than 60 cycles/sec. This has already been done, and the system is called X-10. This system uses communication from places in the home to other places by the existing electric cables. Appliance communication is therefore possible.

Figure 4A:
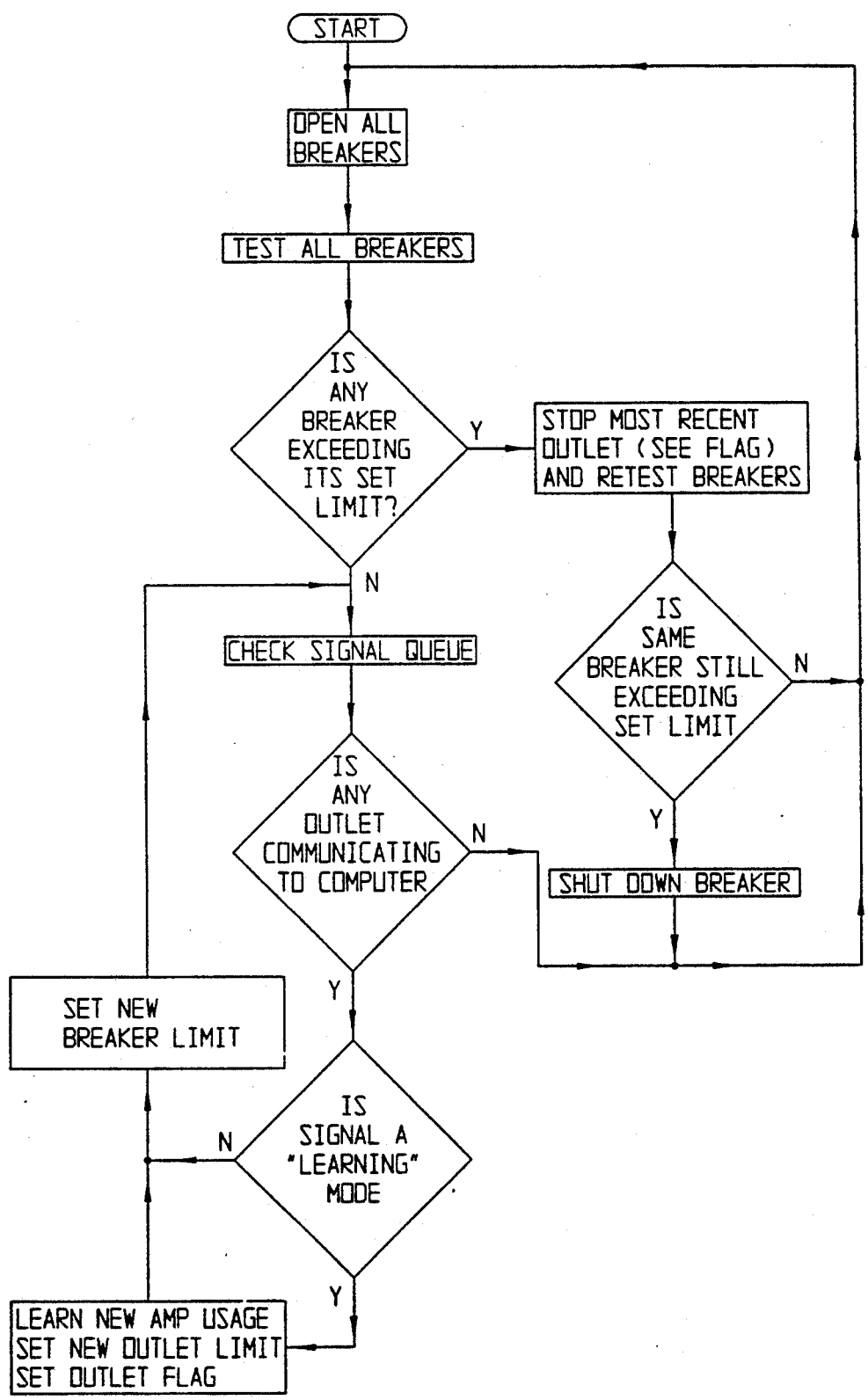
FIG. 4A illustrates the flow chart for the microprocessor.

FIG. 4A shows the flow chart of the processor's 1HD control functions. There are two concepts not illustrated that need defining. An outlet limit is the threshold "learned" limit for a specific individual outlet 3. The breaker limit is the sum of all outlet limits for that circuit at that specific time. Each breaker has a maxiumium allowed limit for a given circuit. The breaker limit must never exceed the breaker max limit(which results in automatic shutdown of the circuit). Both the outlet limit & the breaker limit are changing values. From the start all of the breakers 1E are open. There are three repeating serial questions that are asked. The main question is asked, "Is any breaker exceeding the breaker limit?". First, the computer tests each breaker's ampere usage. If the limit is above the breaker maximum limit, then the breaker is immediately shutdown(not shown in FIG. 4A). If a breaker exceeds the breaker limit, then the computer signals. the most recent used outlet (see outlet flag) to shutdown. If the same breaker is still exceeding its theoretical limit(old breaker limit minus outlet's limit), then the computer shutdowns the breaker 1E. Now the signal queue is checked to see if any messages have come in.

The next question is "Is any outlet module sending a code?" If not, then recycle to the main question. If a code is being received then "Is the code a learning code?" A learning mode requires the breaker limit to be set to a max and retested. This determines the new outlet limit. Finally the new breaker limit is set (sum of all outlets in use) and  ps back to the signal queue.

Figure 5:
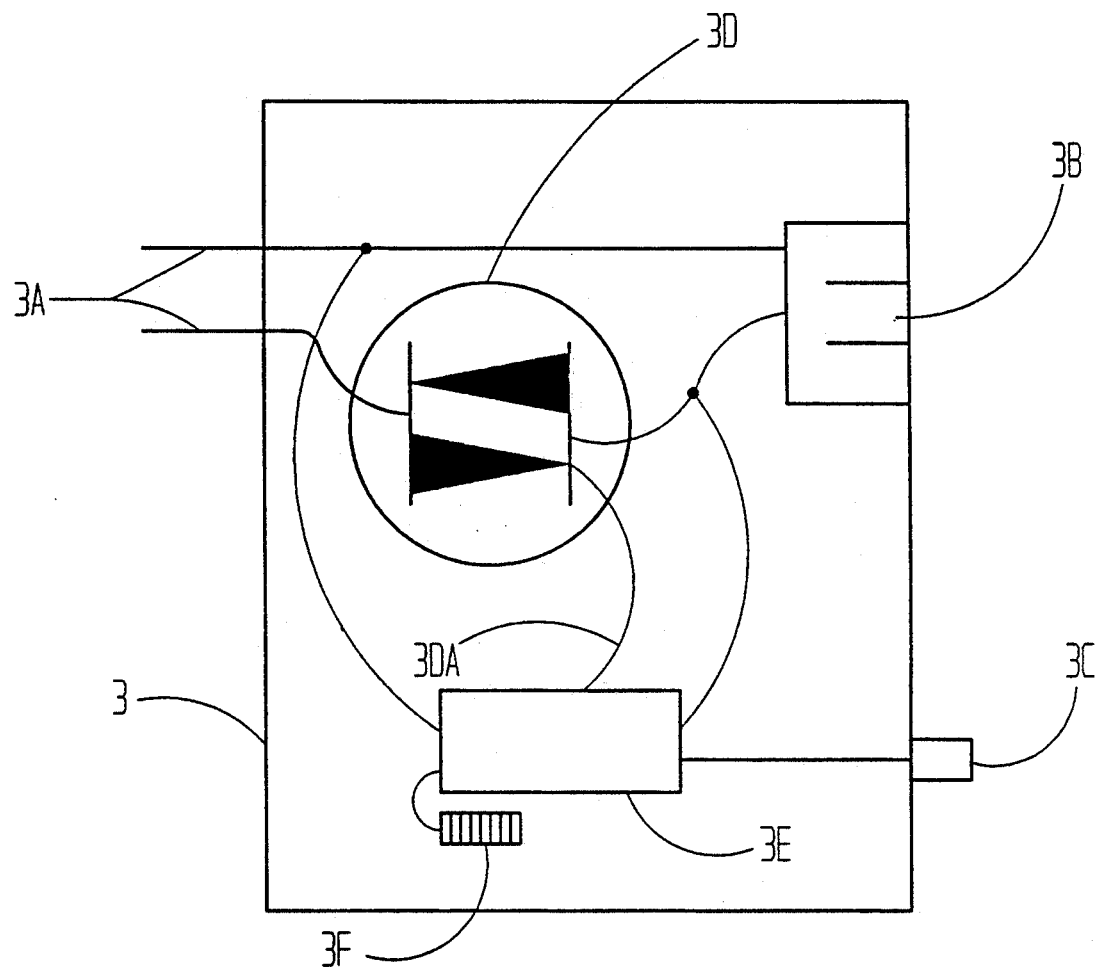
FIG. 5 diagrams the electrical layout of a outlet module.

This figure is the control algorithm for the system. Not shown is the error codes for setting the display 1HH. The reset button 1EC on the breaker 1E, when pressed, signals the computer unit 1HD to set the new breaker limit (recalculation of outlet's 3 limits). FIG. 5 shows the outlet module 3. The box 3 has prongs 3A that fit into regular outlet socket 2. The appliance 2A plugs into the box's 3 socket 3B. When the learning button 3C is pressed, the signal transmitter 3E sends its module's ID and a learning mode signal. The transmitter 3E measures the resistance of the socket 3B. When a load is present(finite resistance), a signal code is sent to the breaker box 1. The breaker box 1 returns a signal to the outlet module. The signal transmitter 3E opens the triac 3D and the current flows. The outlet's triac is small compared to the breaker's triac. In fact, it could be nothing at all. The computer can have a time delay (say 1 millisec) to decide if the outlet doesn't response and shutdown the breaker. There would be no outlet reset; the owner would have to go to the breaker box for reset. The signal traffic would require that the outlets keep signally continuous until asynchronously acknowledged by the computer. The dip switches 3F define the unique ID signal code for that outlet. The energy for the module's function 3 is calculated into the breaker limit (a small constant for each outlet).

The computer controls all breakers and all outlet modules (minibreaker). If an outlet module detects a load in the circuit, it signals computer to add amperage to set the new breaker limit and switches the outlet to open for new use. Ideally, the breaker limit is the sum of all the currently used outlet limits on that circuit. There is a teaching button on each of the outlet modules to tell the computer to learn a new amperage limit. An appliance must be at peak performance while teaching the computer so as not to shutdown the outlet for exceeding the amp limit. In the future, it is possible for appliances and outlet to incorporate the function of the outlet module. In case of a power failure, the rechargable batteries protect the memory so the individual outlet limits are not lost. However if the batteries fail, the system would simply reteach itself the outlet's power usage. The breaker box and outlet can be installed in an old home. No new wiring is needed; however, special switches (not shown) would be required for complete computer operation. Its function would watch guard older wiring against electrical shorts & fires. Construction people can utilize the microprocessor by using a device that tells the computer to turn on or off that circuit.

This will save construction people the time of running back & forth to the breaker box. Initially, the user only has to teach the computer their applicance power usage to be fully operational. Additional maintenance after that is minimal. One extra problem is the error codes for shutdown of a breaker. The following conditions are possible: outlets or switchs with non-unique signal ID codes, excess amperes over the maximum limit and excess amperes over the theoretical limit (could indicate potential fire).

I claim:

1. An adaptive-control circuit breaker system, comprising:

first circuit breaker means responsive to a control signal for opening a first electrical circuit having a plurality of electrical outlets connected thereto;

electronic control means for electronically controlling said first circuit breaker means, said control means including means for generating said control signal in response to electrical current flowing through said circuit in excess of a breaker limit set for said first circuit breaker means, said electronic control means including means for automatically adjusting said breaker limit in response to load conditions;

and means for determining present load conditions at each of said outlets.

2. The system of claim 1, wherein said determining means includes means for detecting the presence of an electrical device connected to one of said outlets and for sending an enabling signal to said electronic control means to enable increasing said breaker limit.

3. The system of claim 2, further comprising a plurality of outlet electronic switch means for selectively connecting respective individual outlets to said circuit, wherein said electronic control means includes means for holding each said outlet electronic switch means open to disconnect its respective outlet from said circuit until said device presence is detected and said enabling signal is sent to said electronic control means.

4. The system of claim 3, wherein said determining means includes means for learning the load requirement of an individual load, said system further comprising a plurality of means remote from said electronic control means for selecting a learning mode during which said learning means operates.

* * * * *